US006328947B1

(12) United States Patent
Monden et al.

(10) Patent No.: US 6,328,947 B1
(45) Date of Patent: Dec. 11, 2001

(54) METHOD FOR PRODUCING FINE PARTICLES OF METAL OXIDE

(75) Inventors: Ryuji Monden, Nagano; Kasumi Nakamura, Chiba; Chozo Inoue, Chiba; Masahiro Ohmori, Chiba; Jun Tanaka, Toyama; Tamotsu Yamashita; Mayumi Miyazawa, both of Chiba, all of (JP)

(73) Assignee: Showa Denko K.K., Tokyo (JP)

( * ) Notice: Subject to any disclaimer, the term of this patent is extended or adjusted under 35 U.S.C. 154(b) by 0 days.

(21) Appl. No.: 09/134,732

(22) Filed: Aug. 14, 1998

(30) Foreign Application Priority Data

Aug. 15, 1997 (JP) .................................. 9-235420
Oct. 8, 1997 (JP) .................................. 9-293376
Jul. 28, 1998 (JP) .................................. 10-212702

(51) Int. Cl.⁷ .................. C01G 23/047; C01G 28/00; C01G 17/02; C01G 25/02; C01F 3/00
(52) U.S. Cl. .................. 423/611; 423/608; 423/612; 423/617; 423/618; 423/624; 502/349; 502/350; 502/353; 502/355
(58) Field of Search .................. 423/598, 608, 423/610, 611, 612, 592, 617, 624; 502/349, 350, 353, 355, 232, 237

(56) References Cited

U.S. PATENT DOCUMENTS

| 3,068,068 | * | 12/1962 | Kenworthy | 23/202 |
|---|---|---|---|---|
| 3,105,743 | * | 10/1963 | Cobb | 23/202 |
| 3,178,264 | * | 4/1965 | Sheehan et al. | 23/202 |
| 3,208,866 | * | 9/1965 | Lewis | 106/300 |
| 3,287,087 | * | 11/1966 | Evans et al. | 23/202 |
| 3,565,580 | * | 2/1971 | Klein et al. | 23/202 |
| 3,709,984 | * | 1/1973 | Dantro | 423/610 |
| 4,012,338 | * | 3/1977 | Urwin | 252/461 |
| 4,067,954 | * | 1/1978 | Volling | 423/336 |
| 4,241,042 | * | 12/1980 | Matijevic et al. | 423/610 |
| 4,741,894 | * | 5/1988 | Melas | 423/592 |
| 4,842,832 | * | 6/1989 | Inoue et al. | 423/211 |
| 4,923,682 | * | 5/1990 | Roberts et al. | 423/611 |
| 5,024,827 | * | 6/1991 | Jones et al. | 423/610 |
| 5,030,439 | * | 7/1991 | Brownbridge | 423/610 |
| 5,049,371 | * | 9/1991 | Rinn et al. | 423/592 |
| 5,169,619 | * | 12/1992 | Yoshimoto et al. | 423/610 |
| 5,456,899 | * | 10/1995 | Inchley | 423/611 |
| 5,635,326 |   | 6/1997 | Kanbayashi et al. | 430/110 |

FOREIGN PATENT DOCUMENTS

| 49-125299 | 11/1974 | (JP) . |
| 59-223231 | 12/1984 | (JP) . |
| 61-266308 | 11/1986 | (JP) .................. C01G/30/00 |
| 1-230407 | 9/1989 | (JP) .................. C01B/13/32 |
| 6-305730 | 11/1994 | (JP) . |
| 7-223815 | 8/1995 | (JP) . |

OTHER PUBLICATIONS

Barksdale, Jelks, Ph. D. Titanium. The Ronald Press: New York. Copyright 1949, p. 76–79.*
English abstract for JP 61–266308.
English abstract for JP 01–230407.
English abstract for JP 06–305730.

* cited by examiner

Primary Examiner—Steven P. Griffin
Assistant Examiner—Cam N. Nguyen
(74) Attorney, Agent, or Firm—Sughrue Mion, PLLC

(57) ABSTRACT

A method for producing fine particles of metal oxide characterized in that metal halide is hydrolyzed in the presence of organic solvent. According to this invention, under hydrolysis of titanium tetrachloride, anatase type titanium oxide can be obtained by selecting hydrophilic organic solvent, and rutile type titanium oxide can be obtained by selecting hydrophobic organic solvent.

7 Claims, 2 Drawing Sheets

METHOD FOR PRODUCING FINE PARTICLES OF METAL OXIDE

BACKGROUND OF THE INVENTION

1. Field of the Invention

This invention relates to a method for producing fine particles of metal oxide, and more specifically, relates to a method for fine particles of metal oxide with the feature of having narrower particle size distribution and moreover for the particles with a little of aggregation. Titanium dioxide (herein after as titanium oxide) is preferred as the metal oxide.

2. Related Background Art

In late years, in the field of fine particle forming such as ceramic, fine particles of metal oxide having narrower particle size distribution and only a little of aggregation thereof is desired as high dimension accuracy material capable of micro-working. Particularly, titanium oxide attracts attention as useful fine particle material in the field of photocatalyst, optical communication, cosmetics and so forth.

As a method for producing fine particles of metal oxide, a method for producing them by hydrolysis of metal alkoxide with organic solvent is proposed in, for example, the Japanese Patent Application Laid-Open Gazette No. Sho 61-266308 in which antimony is used as metal. A method for producing them by hydrolysis of organometal compound is proposed in the Japanese Patent Application Laid-Open Gazette No. Hei 1-230407. Various kinds of metals are listed in it.

Another method in which inorganic acid solution is added to the mixture of organic titanium compound and water-miscible organic solvent followed by hydrolysis thus producing rutile type titanium oxide is proposed (the Japanese Patent Application Laid-Open Gazette No. Hei 6-305730). However, there is a problem that the particles produced by these methods are apt to have wider particle size distribution and aggregate together.

SUMMARY OF THE INVENTION

This invention was done on the background of the above-mentioned technical problems of the prior arts, and an object of this invention is to provide a method, in which particle size is controlled easily, for producing fine particles of metal oxide, preferably titanium oxide, with the feature of having narrower particle size distribution and only a little of aggregation thereof. Another object of this invention is to provide the above described method in which where the metal oxide is titanium oxide, titanium oxide with desired crystal pattern can be produced by selection of solvent.

As a result of intensive efforts to achieve the above-mentioned purposes, the present inventors accomplished this invention described below.

This invention is a method for producing fine particles of metal oxide, the method comprising a step of hydrolyzing metal halide in the presence of organic solvent to obtain the fine particles of metal oxide.

In the above-mentioned method of this invention, it is preferred that the amount of the organic solvent is from about 200 to about 10,000 parts by volume to 100 parts by volume of water.

It is also preferred that the mean particle size of the fine particles of metal oxide is about 20 nm or less than 20 nm.

In the above-mentioned method of this invention, it is preferred that the metal halide is titanium tetrachloride and the metal oxide is titanium dioxide.

In this case, when the organic solvent may be hydrophilic and the titanium dioxide is anatase type.

Alternatively, when the organic solvent may be hydrophobic and titanium dioxide is rutile type.

According to this invention, fine particles of metal oxide with mean particle size of about 20 nm or less than 20 nm, narrower particle size distribution and only a little of aggregation thereof can be made.

DESCRIPTION OF THE PREFERRED EMBODIMENTS

Figure 1:
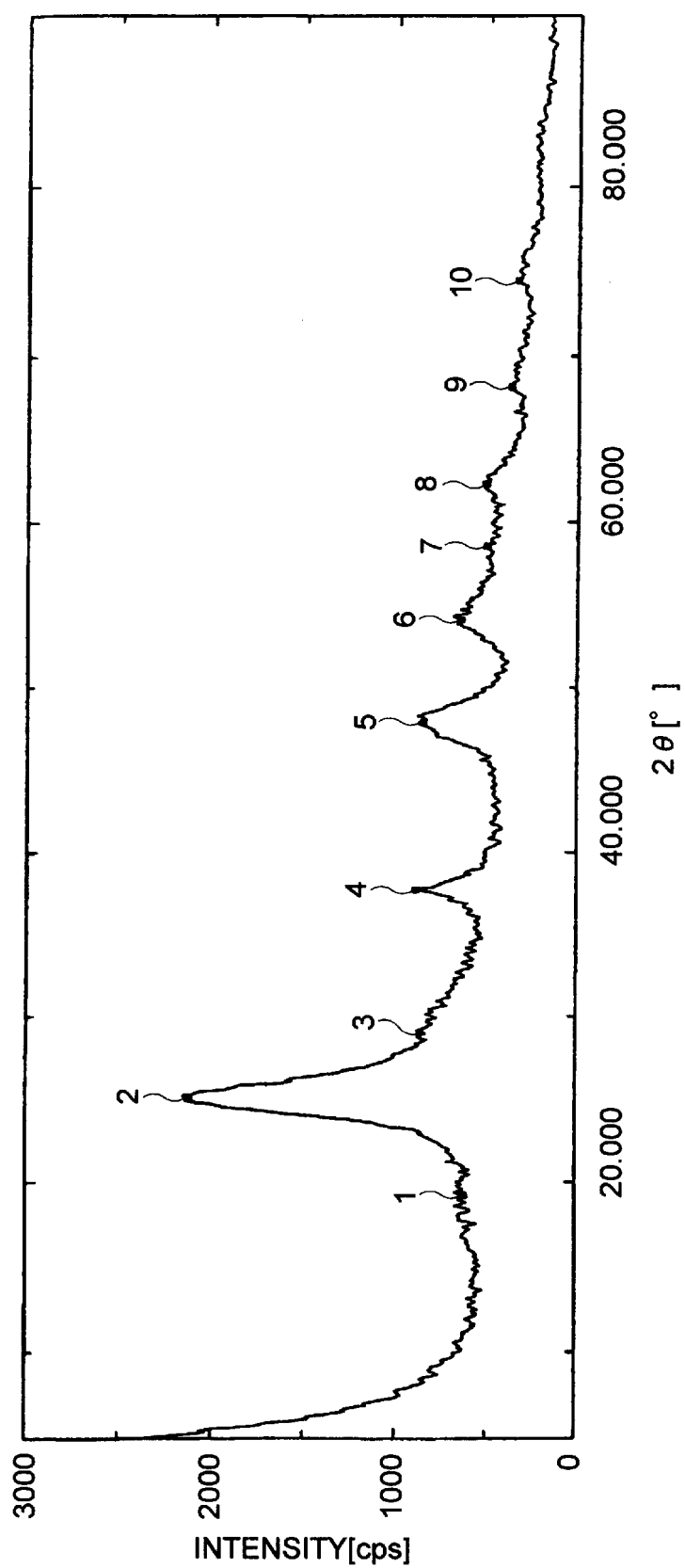
FIG. 1 is an X-ray diffraction pattern of anatase type crystalline titanium oxide of this invention.

This invention will be hereinafter explained in detail.

The method for producing fine particles of metal oxide of this invention is basically a method of hydrolysis of metal halide and this invention enables the achievement of the above-mentioned purposes by adding organic solvent, preferably in a large amount of the solvent, during the hydrolysis.

Examples of metal oxide targeted by this invention are metal oxides obtained by hydrolysis of metal halide, for example, oxides of metals categorized in the III, IV and V groups of periodic table, such as silicon oxide, germanium oxide, tin oxide, titanium oxide, zirconium oxide, boron oxide, gallium oxide, indium oxide, thallium oxide, scandium oxide, yttrium oxide, lanthanum oxide, antimony oxide, bismuth oxide, vanadium oxide, niobium oxide, tantalum oxide, lanthanoid oxide and actinoid oxide, preferably, silicon oxide, germaniumoxide, titaniumoxide, zirconium oxide, tin oxide and tantalum oxide, more preferably, titanium oxide.

Metal halides to be used to obtain the abovementioned metal oxides by hydrolysis are metal halide represented by the general formula: $MX_n$ (wherein M is metal element, X is halogen and n is integral number corresponding to the valence of M).

Example of such metal halide is, for example, silicon chloride, germanium chloride, tin chloride, titanium chloride, zirconium chloride, boron chloride, gallium chloride, indium chloride, thallium chloride, scandium chloride, yttrium chloride, lanthanum chloride, antimony chloride, bismuth chloride, vanadium chloride, niobium chloride, tantalum chloride, lanthanoid chloride, actinoid chloride, silicon bromide, germanium bromide, tin bromide, titanium bromide, zirconium bromide, boron bromide, gallium bromide, indium bromide, thallium bromide, scandium bromide, yttrium bromide, lanthanum bromide, antimony bromide, bismuth bromide, vanadium bromide, niobium bromide, tantalum bromide, lanthanoid bromide, actinoid bromide, preferably silicon chloride, germanium chloride, titanium chloride, zirconium chloride, silicon bromide, germanium bromide, titanium bromide, zirconium bromide, more preferably titanium chloride (titanium tetrachloride).

These metal halides may be used alone or in any combination of two or more thereamong.

The hydrolysis of these metal halides is represented as the following formula:

$$MX_n + \tfrac{1}{2}nH_2O \rightarrow MO_{n/2} + nHCl$$

(where n of $MX_n$ is 3 or 5, $MX_{n/2}$ becomes $M_2O_3$ or $M_2O_5$) by using the above-mentioned general formula of $MO_n$.

Theoretical volume of water necessary to hydrolysis is determined by use of the above-mentioned formula.

In this invention, the amount of water is preferably from about 1 to about 100 times of this theoretical volume, more preferably the range of from about 1 to about 10 times. Where there is too much water, aggregation of fine particles produced is likely to be significant.

Water to be used in this invention may be service water, distilled water and ion-exchanged water. Among these water, distilled water or ion-exchanged water is preferable, and ion-exchanged water with electric conductivity being about $2\times10^{-6}$ $\Omega^{-1}$ $cm^{-1}$ or less is more preferable.

The organic solvent to be used in this invention is any organic solvent having its freezing point less than the temperature which metal halide is not hydrolyzed with water, is preferably one having its freezing point of about 0° C. or lower, more preferably one having its freezing point of about −10° C. or lower.

Such organic solvent includes organic solvent not able to react with metal halide, such as alcohols, aliphatic hydrocarbons, aromatic hydrocarbons, halogenated hydrocarbons, ketones, esters, ethers, amides, sulfoxides, sulfones, sulfonate esters.

Examples of such organic solvents are methanol, ethanol, propanol, butanol, pentanol, hexanol, octanol, nonanol, benzyl alcohol, methylcyclohexanol, ethanediol, propanediol, butanediol, pentanediol, hexylenediol, octylenediol, hexanetriol, butyl formate, pentyl formate, methyl acetate, ethyl acetate, propyl acetate, butyl acetate, pentyl acetate, hexyl acetate, benzyl acetate, 3- methoxybutyl acetate, 2- ethylbutyl acetate, 2- ethylhexyl acetate, methyl propionate, ethyl propionate, butyl propionate, pentyl propionate, dimethylformamide, dimethylacetamide, diethylformamide, diethylacetamide, dimethyl ketone, methyl ethyl ketone, pentanone, hexanone, methyl isobutyl ketone, heptanone, diisobutyl ketone, acetonitrile, diethyl ether, dipropyl ether, diisopropyl ether, dibutyl ether, dihexyl ether, anisole, tetrahydrofuran, tetrahydropyran, dimethoxyethane, diethoxyethane, dibutoxyethane, diethylene glycol dimethyl ether, diethylene glycol diethyl ether, ethylene glycol dibutyl ether, methylal, acetal, pentane, hexane, heptane, octane, nonane, decane, dodecane, toluene, xylene, ethylbenzene, cumene, mesitylene, tetrahydronaphthalene, butylbenzene, cymene, diethylbenzene, pentylbenzene, dipentylbenzene, cyclopentane, cyclohexane, methyl cyclohexane, ethyl cyclohexane, decalin, chloromethane, dichloromethane, trichloromethane, tetrachloromethane, chloroethane, dichloroethane, trichloroethane, tetrachloroethane, pentachloroethane, chloropropane, dichloropropane, trichloropropane, chlorobutane, dichlorobutane, trichlorobutane, chloropentane, chlorobenzene, dichlorobenzene, chlorotoluene, dichlorotoluene, bromomethane, bromoethane, bromopropane, bromobenzene, chlorobromoethane, and so forth. Among these, alcohols, amides and hydrocarbons are preferable, and ethyl alcohol, dimethylformamide, dimethylacetamide and toluene are more preferable. The above-mentioned organic solvent may be used alone or in any combination of two or more thereamong.

A method for mixing above-mentioned metal halide, water and organic solvent is not restricted. For example, in the beginning step, water may be mixed with organic solvent, and then metal halide may be added to the resultant mixture. In this way, where water is mixed with organic solvent homogeneously, the resultant mixture can be used as it is.

Where water can not be mixed with organic solvent homogeneously, surfactant such as sodium 1,2- bis -(2- ethylhexyloxycarbonyl) -1- ethane sulfonate and polyoxyethylene alkyl phenyl ether, agitation or sonication may be used to accomplish the uniformity of the mixture. Upon using surfactant for dispersion, the composition of this invention would be usually w/o type emulsion because of high content of organic solvent.

Alternatively, in the beginning step, metal halide may be added to water, and then organic solvent may be added to the resultant mixture. In this way, it is necessary that the temperature of the mixture of water and metal halide is kept under the temperature not to occur hydrolysis before organic solvent is added. This is because it is an essential element of this invention that hydrolysis of metal halide is done in the presence of organic solvent.

The amount of water added to metal halide is preferable in the above-mentioned range, and this invention is characterized in that organic solvent, preferably a large amount of organic solvent is used with water. That is, the amount of organic solvent mixed with 100 parts by volume of water is preferably from about 200 to about 10,000 parts by volume, and more preferably from about 1,000 to about 7,000 parts by volume. Where organic solvent is too little, fine particles produced grow up with binding each other and it is apt to be difficult to control the particle size, and on the other hand, it prevents this problem effectively to add more than about 200 parts by volume of organic solvent. However, where the amount of organic solvent added is more than about 10,000 parts by volume, the solution is too dilute and whereby operations after producing fine particles such as centrifugation and filtration are apt to be difficult and to disadvantage the cost.

Hydrolysis is done by heating the above-mentioned mixture. While hydrolysis temperature is not particularly restricted as long as hydrolysis is proceeded, the temperature is preferably close to the boiling point of the mixture or the dispersion in a view of accelerating reaction rate.

One embodiment of the invention in which the metal oxide is titanium oxide will be hereinbelow explained in detail. Under this invention in which titanium halide is hydrolyzed in the presence of organic solvent, and crystal pattern of the titanium oxide produced can be changed depending on the kind of organic solvent. That is, the produced titanium oxide is anatase type where organic solvent to be used is hydrophilic, while the produced titanium oxide is rutile type where organic solvent is hydrophobic. This enable to obtain desired crystal type of titanium oxide suitable for various kinds of applications.

The term of hydrophilic organic solvent herein means organic solvent miscible with water under the room temperature, and examples of organic solvent preferably used in this invention are alchols such as methanol, ethanol and butanol, amides such as dimethyl acetamide and dimethyl formamide, ketones such as acetone and methyl ethyl ketone. The term of hydrophobic organic solvent herein means organic solvent non-miscible with water under the room temperature, and particularly preferable examples used in this invention are aromatic hydrocarbons such as benzene, toluene and xylene, aliphatic hydrocarbons such as hexane, heptane and octane.

Examples of titanium halide used for hydrolysis in this invention are titanium chloride such as $TiCl_4$, titanium bromide such as $TiBr_4$ and titanium iodide such as $TiI_4$. Among these, $TiCl_4$ is most preferable.

The other conditions, such as mixing ratio of titanium halide, water and organic solvent and hydrolysis condition are the same as the above-described ones.

Fine particles of metal oxide produced by hydrolysis are separated from the reaction mixture by use of filtration, centrifugation and so forth, washed, and then dried by use of hot-air drying, infrared drying, spray drying or vacuum drying.

Fine particles of metal oxide produced according to the above-described method have mean particle size of about 20 nm or smaller, and are unlikely to aggregate together during preservation, and thereby can be used as material for ceramic and other product as it is, or can be used after burning.

This invention will be hereinbelow explained in detail by some examples. However, this invention is not limited by the following examples.

Example 1

Three grams of titanium tetrachloride and 2 ml of water were added into a 100 ml-volume flask, and then 40 ml of dimethylformamide was added to them, and the flask was equipped with reflux condenser followed by heating at 100° C. for 1 hour to hydrolyze the titanium tetrachloride. The resultant sol was separated by centrifugation, and washed with ethanol and water followed by drying under reduced pressure to obtain fine particles. An X-ray diffraction analysis of the resultant fine particles showed that it was anatase type crystalline titanium oxide. The X-ray diffraction is shown as FIG. 1. An analysis by transmission electron microscope showed that the particles had 2–3 nm particle size and narrow particle size distribution.

Example 2

Three grams of titanium tetrachloride and 2 ml of water were added into a 100 ml-volume flask, and then 40 ml of ethanol was added to them, and the flask was equipped with reflux condenser followed by heat-refluxing for 1 hour to hydrolyze the titanium tetrachloride. After washing, the resultant sol was treated by the same as set forth in Example 1 to obtain fine particles (provided that washing was done only with water). An X-ray diffraction analysis of the resultant fine particles showed that it was anatase type crystalline titanium oxide. An analysis by transmission electron microscope showed that the particles had 2–6 nm particle size and narrow particle size distribution.

Example 3

Figure 2:
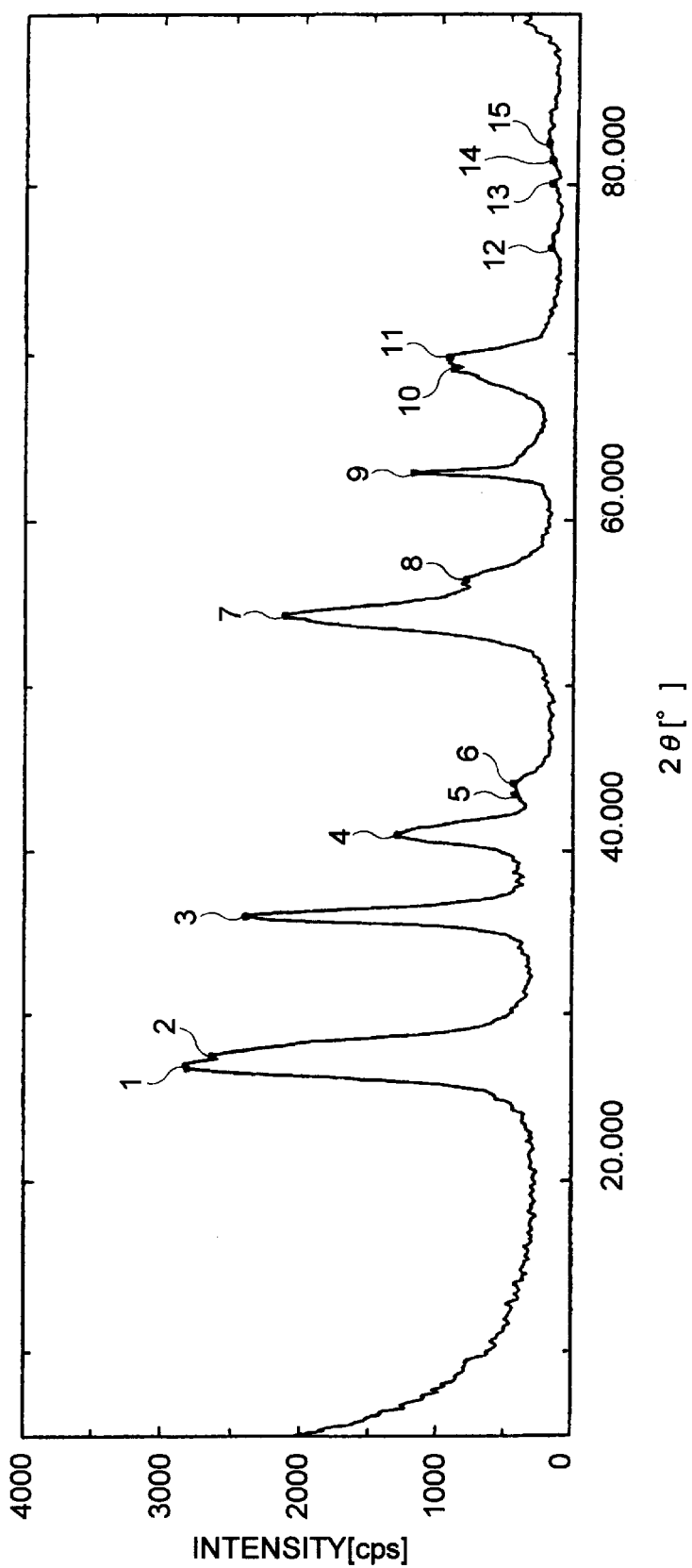
FIG. 2 is an X-ray diffraction pattern of rutile type crystalline titanium oxide of this invention.

Three grams of titanium tetrachloride and 2 ml of water were added into a 100 ml-volume flask, and then 40 ml of toluene was added to them, and the flask was equipped with reflux condenser followed by heating at 100° C. for 1 hour to hydrolyze the titanium tetrachloride. The procedures as set forth in Example 1 were repeated to obtain fine particles. An X-ray diffraction analysis of the resultant fine particles showed that it was rutile type crystalline titanium oxide. The X-ray diffraction is shown as FIG. 2. An analysis by transmission electron microscope showed that the particles had 2–7 nm particle size and narrow particle size distribution.

Example 4

Titanium tetrachloride 3.7 g was dissolved in 40 ml of dimethylformamide at about 10° C. before the resultant solution was transferred into a 100 ml-volume flask. Then 0.7 ml of water was added dropwise so as not to raise the temperature followed by heating them at 100° C. for 1 hour to hydrolyze the titanium tetrachloride. The procedures as set forth in Example 1 was repeated to obtain fine particles. An X-ray diffraction analysis of the resultant fine particles showed that it was anatase type crystalline titanium oxide. An analysis by transmission electron microscope showed that the particles had 2–4 nm particle size and narrow particle size distribution.

Example 5

Three grams of silicon chloride ($SiCl_4$) and 2 ml of water were added into a 100 ml-volume flask and then 40 ml of dimethylacetamide was added to them, and the flask was equipped with reflux condenser followed by heating at 100° C. for 1 hour to hydrolyze the silicon chloride. The procedures as set forth in Example 1 was repeated to obtain 1.2 g of fine particles. An X-ray diffraction analysis of the resultant fine particles showed that it was crystalline silicon oxide ($SiO_2$). An analysis by transmission electron microscope showed that the particles had 3–5 nm particle size and narrow particle size distribution.

Example 6

With a 100 ml-volume flask, 5.8 g of antimony chloride ($SbCl_3$) was dissolved in 40 ml of dimethylacetamide at about 10° C., and then 0.9 ml of water was added dropwise so as not to raise the temperature. The flask was equipped with reflux condenser followed by heating at 100° C for 1 hour to hydrolyze the antimony chloride. The procedures as set forth in Example 1 were repeated to obtain 2 g of fine particles. An X-ray diffraction analysis of the resultant fine particles showed that it was crystalline antimony oxide ($Sb_2O_3$). An analysis by transmission electron microscope showed that the particles had 2–5 nm particle size and narrow particle size distribution.

Example 7

With a 100 ml-volume flask, 5.1 g of tin chloride ($SnCl_4$) was dissolved in 40 ml of dimethylacetamide at about 10° C., and then 0.7 ml of water was added dropwise so as not to raise the temperature. The flask was equipped with reflux condenser followed by heating at 100° C. for 1 hour to hydrolyze the tin chloride. The procedures as set forth in Example 1 were repeated to obtain 2.5 g of fine particles. An X-ray diffraction analysis of the resultant fine particles showed that it was crystalline tin oxide ($SnO_2$). An analysis by transmission electron microscope showed that the particles had 2–4 nm particle size and narrow particle size distribution.

Example 8

With a 100 ml-volume flask, 4.5 g of zirconium chloride ($ZrCl_4$) was dissolved in 40 ml of dimethylacetamide at about 10° C., and then 0.7 ml of water was added dropwise so as not to raise the temperature. The flask was equipped with reflux condenser followed by heating at 100° C. for 1 hour to hydrolyze the zirconium chloride. The procedures as set forth in Example 1 were repeated to obtain 2.1 g of fine particles. An X-ray diffraction analysis of the resultant fine particles showed that it was crystalline zirconium oxide ($ZrO_2$). An analysis by transmission electron microscope showed that the particles had 3–5 nm particle size and narrow particle size distribution.

Example 9

With a 100 ml-volume flask, 7 g of tantalum chloride ($TaCl_5$) was dissolved in 40 ml of dimethylacetamide at about 10° C., and then 0.9 ml of water was added dropwise so as not to raise the temperature. The flask was equipped with reflux condenser followed by heating at 100° C. for 1 hour to hydrolyze the tantalum chloride. The procedures as set forth in Example 1 were repeated to obtain 2.5 g of fine particles. An X-ray diffraction analysis of the resultant fine particles showed that it was crystalline tantalum oxide ($Ta_2O_5$). An analysis by transmission electron microscope showed that the particles had 2–3 nm particle size and narrow particle size distribution.

Example 10

With a 100 ml-volume flask, 4.2 g of germanium chloride ($GeCl_4$) was dissolved in 40 ml of dimethylacetamide at about 10° C., and then 0.7 ml of water was added dropwise so as not to raise the temperature. The flask was equipped with reflux condenser followed by heating at 100° C. for 1 hour to hydrolyze the germanium chloride. The procedures as set forth in Example 1 were repeated to obtain 1.8 g of fine particles. An X-ray diffraction analysis of the resultant fine particles showed that it was crystalline germanium oxide ($GeO_2$). An analysis by transmission electron microscope showed that the particles had 2–3 nm particle size and narrow particle size distribution.

Any fine particles obtained by the above described examples have little or only a little of aggregation thereof and good dispersibility.

According to this invention, metal halide is hydrolyzed with water in the presence of organic solvent, whereby fine particles of metal oxide having only a little of aggregation thereof and good dispersibility can be obtained. Where the amount of organic solvent is in the range of from about 200 to about 10,000 parts by volume to 100 parts by volume of water, this effect is significant. The particle size distribution also can be within considerable narrow range.

Where metal halide is titanium tetrachloride and metal oxide is titanium oxide, crystal pattern of titanium oxide can be controlled as either atatase or rutile type by selecting hydrophilic or hydrophobic organic solvent, and such type c a n be selected in compliance with any application, and therefore, this invention provides a method for producing fine particles capable of controlling crystal pattern voluntary.

What is claimed is:

1. A method for producing fine particles of metal oxide, comprising hydrolyzing metal halide in the presence of organic solvent to obtain the fine particles of metal oxide, wherein the amount of said organic solvent is from about 200 to about 10,000 parts by volume per 100 parts by volume of water and the amount of said water is from about 1 to about 100 times a theotetical volume of metal halide, and the mean particle size of said fine particle of metal oxide is about 20 nm or smaller.

2. A method for producing fine particles of metal oxide according to claim 1, wherein said metal halide is titanium tetrchloride and said metal oxide is titanium dioxide.

3. A method for producing fine particles of metal oxide according to claim 2, wherein said organic solvent is hydrophilic and said titanium dioxide has an anatase structure.

4. A method for producing fine particles of metal oxide according to claim 2, wherein said organic solvent is hydrophobic and said titanium dioxide is in a rutile form.

5. A method for producing fine particles of metal oxide according to claim 1, wherein said metal halide is selected from the group consisting of silicon chloride, germanium chloride, tin chloride, zirconium chloride, boron chloride, gallium chloride, indium chloride, thallium chloride, scandium chloride, yttrium chloride, lanthanum chloride, antimony chloride, bismuth chloride, vanadium chloride, niobium chloride, tanalum chloride, lantanoid chloride, actinoid chloride, silicon bromide, germanium bromide, tin bromide, zirconium bromide, boron bromide, gallium bromide, indium bromide, thallium bromide, scandium bromide, yttrium bromide, lanthanum bromide, antimony bromide, bismuth bromide, vanadium bromide, niobium bromide, tantalum bromide, lanthanoid bromide, and actinoid bromide, and further wherein the corresponding metal oxide is selected from the group consisting of silicon oxide, germanium oxide, tin oxide, zirconium oxide, boron oxide, gallium oxide, indium oxide, thallium oxide, scandium oxide, yttrium oxide, lanthanum oxide, antimony oxide, bismuth oxide, vanadium oxide, niobium oxide, tantalum oxide, lanthanoid oxide, and actinoid oxide.

6. A method for producing fine particles of metal oxide according to claim 5, wherein said metal halide is selected from the group consisting of silicon chloride, germanium chloride, zirconium chloride, silicon bromide, germanium bromide and zirconium bromide.

7. A method for producing fine particles of metal oxide, comprising mixing water and organic solvent to form a mixture; adding metal halide to the mixture; and then hydrolyzing the metal halide, wherein the amount of said organic solvent is from about 200 to about 10,000 parts by volume per 100 parts by volume of water and the amount of said water is from about 1 to about 100 times a theoretical volume of metal halide, and further wherein the mean particle size of said fine particles of metal oxide is about 20 nm or smaller.

* * * * *